United States Patent
Dobaisi et al.

(10) Patent No.: US 12,372,165 B2
(45) Date of Patent: Jul. 29, 2025

(54) TORQUE-LIMITER COUPLING FOR VALVE ACTUATOR

(71) Applicant: SAUDI ARABIAN OIL COMPANY, Dhahran (SA)

(72) Inventors: Mahdi Y. Dobaisi, Shaybah (SA); Hamzah M. Moqdad, Shaybah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 112 days.

(21) Appl. No.: 18/341,628

(22) Filed: Jun. 26, 2023

(65) Prior Publication Data

US 2024/0426393 A1 Dec. 26, 2024

(51) Int. Cl.
*F16K 31/53* (2006.01)
*F16D 9/10* (2006.01)

(52) U.S. Cl.
CPC .......... *F16K 31/535* (2013.01); *F16D 9/10* (2013.01)

(58) Field of Classification Search
None
See application file for complete search history.

(56) References Cited

U.S. PATENT DOCUMENTS

| | | | | |
|---|---|---|---|---|
| 2,184,513 A * | 12/1939 | Clade | ........... | F16K 31/535 251/249.5 |
| 3,701,362 A * | 10/1972 | Reese | ........... | F16K 37/0008 137/68.16 |
| 5,544,675 A * | 8/1996 | Dean | ........... | F16K 35/04 403/2 |
| 6,393,931 B1 * | 5/2002 | Spangenberg | ........... | F16H 3/06 251/249.5 |
| 6,981,513 B2 * | 1/2006 | Krywitsky | ........... | F16K 27/07 137/68.14 |
| 7,207,547 B2 * | 4/2007 | Fortino | ........... | F16K 27/07 251/249.5 |
| 7,819,386 B2 * | 10/2010 | Combs | ........... | F16K 5/0647 251/315.01 |

FOREIGN PATENT DOCUMENTS

DE 102016125750 A1 7/2017

* cited by examiner

*Primary Examiner* — Matthew W Jellett
(74) *Attorney, Agent, or Firm* — Vorys, Sater, Seymour and Pease LLP

(57) ABSTRACT

A valve actuator system includes a gearbox assembly including an output gear for coupling to a valve stem, an input gear operably coupled to the output gear to drive rotation of the output gear and an input shaft operably coupled to the input gear to drive rotation of the input gear, a torque-limiter coupling having a solid body defining a proximal end and a distal end, the proximal end including a recessed interior accepting the input shaft of the gearbox assembly, a retainer extending between the torque-limiter coupling and the input shaft to transmit torque therebetween, the retainer operable to disengage the torque-limiter coupling from the input shaft in response to a torque applied to the torque limiter-coupling exceeding a critical torque predetermined to prevent damage to the gearbox assembly, and an actuator operatively coupled to the proximal end of the torque-limiter coupling to provide torque to the torque-limiter coupling.

20 Claims, 4 Drawing Sheets

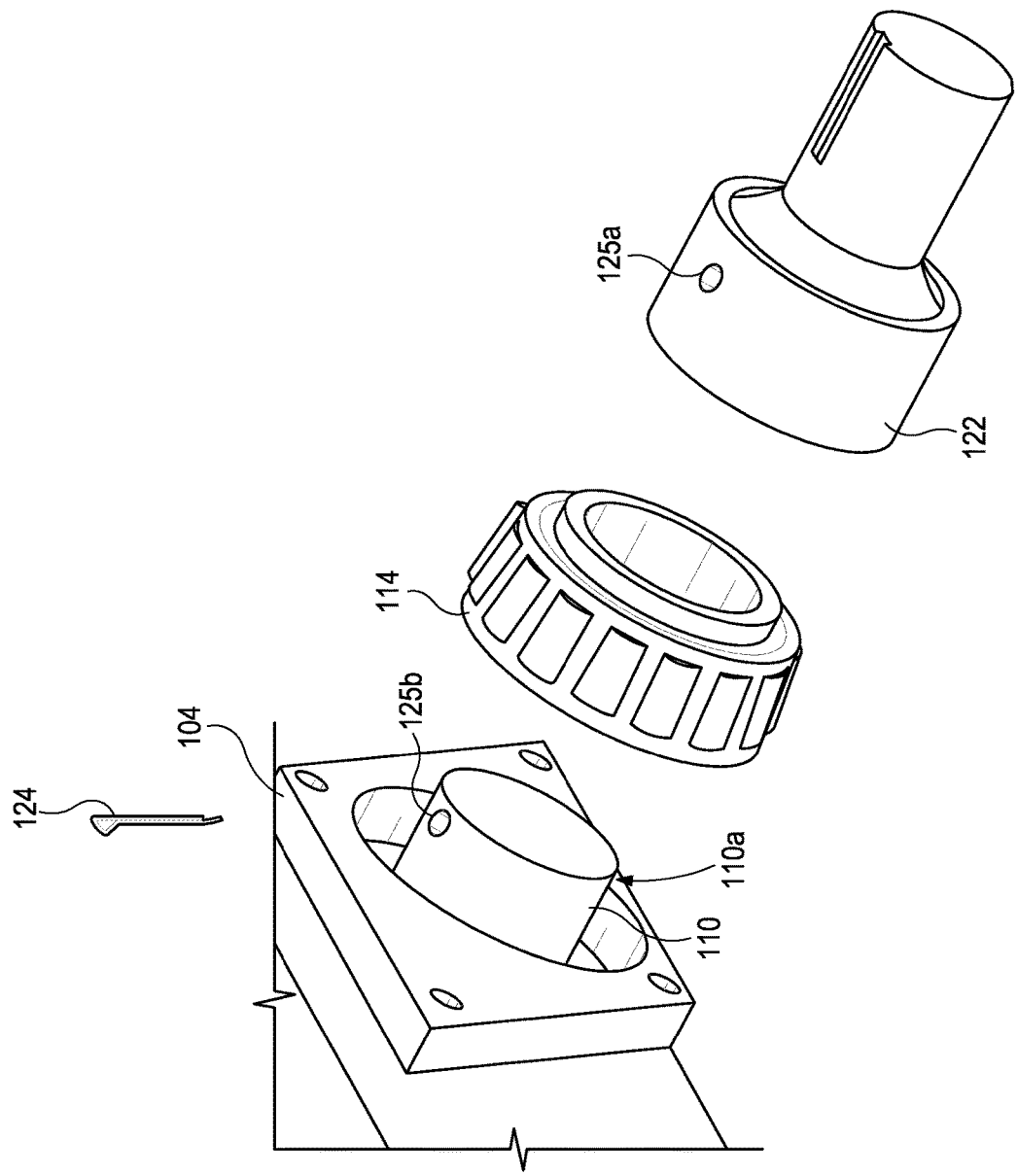

TORQUE-LIMITER COUPLING FOR VALVE ACTUATOR

FIELD OF THE DISCLOSURE

The present disclosure relates generally to valve actuation and, more particularly, to a coupling for selectively coupling a handwheel or other actuator to a gearbox assembly in a valve actuator system.

BACKGROUND OF THE DISCLOSURE

For the actuation of many valves, including gate or sluice valves, ball valves, or butterfly valves, an actuator such as a handwheel may be installed for an operator to manually open and close a valve. Many manually operable valves utilize a gearbox which enables transfer of motion from the handwheel to a closure member of the valve. One commonly utilized drive mechanism in a gearbox is a worm drive, which includes a worm shaft and worm gear. The worm drive enables transmission of rotational motion from the handwheel to rotational motion of the closure mechanism or another driven component of the valve in a perpendicular direction. As such, the handwheel may be mounted in an ergonomic or accessible position for an operator to manually adjust, open, or close the valve. In order to mount the handwheel to the gearbox, one or more couplings may be employed which enable transmission of torque between the worm shaft and the handwheel or a handwheel shaft. Conventional couplings utilize splined surfaces for sufficient transmission of torque.

During valve operations, one or more factors may cause the jamming or sticking of the valve. As such, an operator may apply a force with the handwheel greater than can be safely transmitted through the gearbox in an attempt to unjam the valve. The gearbox may become overloaded, and damage to the drive mechanism may occur. This gearbox damage can be costly to repair, can cause downtime for a fluid line in which the valve is located, and may require sourcing and replacement of the entire gearbox.

Accordingly, a handwheel coupling which may sufficiently transfer torque from the handwheel to the drive mechanism while preventing overloading of the gearbox is desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a valve actuator system includes a gearbox assembly including an output gear for coupling to a valve stem, an input gear operably coupled to the output gear to drive rotation of the output gear and an input shaft operably coupled to the input gear to drive rotation of the input gear, a torque-limiter coupling having a solid body defining a proximal end and a distal end, the proximal end including a recessed interior accepting the input shaft of the gearbox assembly therein, a retainer extending between the torque-limiter coupling and the input shaft to transmit torque therebetween, the retainer operable to disengage the torque-limiter coupling from the input shaft in response to a torque applied to the torque limiter-coupling exceeding a critical torque predetermined to prevent damage to the gearbox assembly, and an actuator operatively coupled to the proximal end of the torque-limiter coupling to provide torque to the torque-limiter coupling.

In another embodiment, a method includes locating a gearbox assembly including an output gear coupled to a valve stem of a valve, wherein the gearbox assembly includes an input gear operably coupled to the output gear to drive rotation of the output gear and an input shaft operably coupled to the input gear to drive rotation of the input gear, securing a torque-limiter coupling to the input shaft of the gearbox assembly such that the torque-limiter coupling freely rotates about the input shaft, installing a retainer to extend between the torque-limiter coupling and the input shaft to transmit torque therebetween, the retainer operable to disengage the torque-limiter coupling from the input shaft in response to a torque applied to the torque limiter-coupling exceeding a critical torque predetermined to prevent damage to the gearbox assembly, and coupling an actuator onto the torque-limiter coupling such that the actuator is operatively coupled to the input shaft to transmit torque thereto.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 1B is an exploded view of a portion of the valve actuator system of FIG. 1 illustrating an attachment of the torque-limiter coupling to an axial end of a worm shaft.

DETAILED DESCRIPTION

Figure 1A:
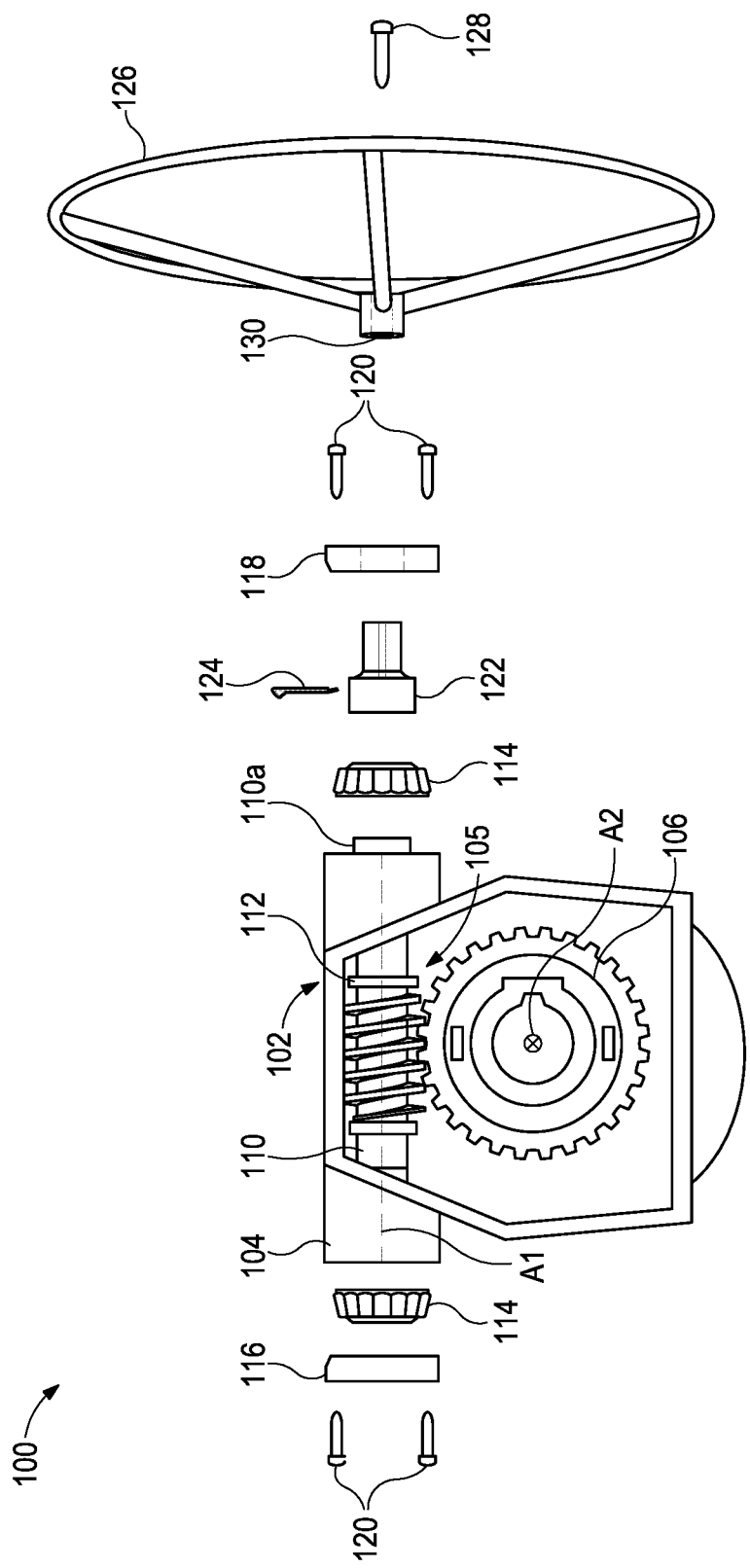
FIG. 1A is an exploded view of a valve actuator system that may employ a torque-limiter coupling according to one or more principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to valve actuation and, more particularly, to a coupling for selectively disengaging a handwheel or other actuator from a gearbox of a valve. Embodiments disclosed herein may include a valve actuator system which includes a gearbox assembly, an actuator, and a torque-limiter coupling which may permit disengaging the actuator from a drive mechanism in the gearbox assembly to prevent an overload of the gearbox assembly. The torque-limiter coupling may be secured using a replaceable, breakable retainer, such that neither the gearbox assembly nor the torque-limiter coupling may require replacement in the event the breakable retainer is broken. This may drastically reduce repair and reinstallation costs due to a jammed valve. Embodiments disclosed herein may further include a method for installation and reinstallation of a torque-limiter coupling, such that existing systems may be modified and adapted to utilize the torque-limiter coupling as described herein.

FIG. 1A is an exploded view of a valve actuator system 100 that may employ one or more principles of the present disclosure. The valve actuator system 100 may be installed onto a valve (not shown) for enabling manual actuation of the valve. The valve actuator system 100 may include a gearbox assembly 102. The gearbox assembly 102 may include a gearbox housing 104 in which a drive mechanism 105 may be installed and/or protected. In the illustrated embodiment, the drive mechanism 105 is shown as a worm drive for perpendicular transmission of torque. The drive mechanism 105 may include an output gear such as a worm gear 106, or "worm wheel", rotatably mounted in the gearbox housing 104. The worm gear 106 may include a keyed bore 107 though which a valve stem of a valve (not shown) or a shaft of an alternate driven system (not shown) may be coupled to receive rotational motion from the gearbox assembly 102. The worm gear 106 may be mated to, or operatively coupled to, an input shaft such as worm shaft 110 upon which an input gear such as helical gear 112, or a "worm", is defined or otherwise attached. Rotation of the worm shaft 110 about an axis A1 induces rotation of the worm gear 106 about an orthogonal axis A2 via the operative coupling between the teeth the worm gear 106 and helical gear 112. An axial end 110a of the worm shaft 110 may protrude or extend from the gearbox housing 104, such that the worm shaft 110 may receive rotational motion from an actuator 126, such as a handwheel, as described in greater detail below.

The gearbox assembly 102 may further include one or more bearings 114, which may support the worm shaft 110 and further facilitate rotation. In the illustrated embodiment, two bearings 114 are included in the gearbox assembly 102 on opposing external surfaces of the gearbox housing 104. The bearings 114 may be secured to the gearbox housing 104 by a first side cover 116, a second side cover 118, and a plurality of fasteners 120. The first side cover 116 may support a single bearing 114 on the gearbox housing 104. In contrast, the second side cover 118 may be sized to support both a bearing 114 and a torque-limiter coupling 122.

Referring to FIG. 1B, a portion of the valve actuator system 100 near the axial end 110a of the worm shaft 110 is illustrated. The axial end 110a of the worm shaft 110 protrudes from the gearbox housing 104, such that a bearing 114 and torque-limiter coupling 122 may be loaded thereon. The torque-limiter coupling 122 may be mated to the worm shaft 110 via a retainer 124 to enable transmission of torque from the torque-limiter coupling 122 to the worm shaft 110. The retainer 124 may be installed through a coupling hole 125a and a corresponding shaft hole 125b extending transversely to the rotational axis A1. The coupling hole 125a and the shaft hole 125b may be similarly sized to accept the retainer 124 while maintaining an interference fit. The retainer 124 may be designed or selected to withstand a maximum torque value, such that the retainer 124 will break or release if a greater torque value is applied to the torque-limiter coupling 122. In the event that the retainer 124 is broken, the torque-limiter coupling 122 may be disengaged from the worm shaft 110 and free to rotate independently of the worm shaft 110. This disengaging may prevent any damage to the drive mechanism 105 or the attached valve or system due to over-torqueing. In the illustrated embodiment, the retainer 124 is a cotter pin which is inserted through the coupling hole 125a and the shaft hole 125b. However, those skilled in the art will readily appreciate that a shear pin or any breakable or releasable component may be utilized as the retainer 124 without departing from the scope of this disclosure.

Returning now to FIG. 1A, the torque-limiter coupling 122 may be mated directly to the actuator 126. The actuator 126 may include any mechanism which may provide torque to the torque-limiter coupling 122 for rotating the worm shaft 110. In the illustrated embodiment, the actuator 126 is shown as a handwheel which may enable manual provision of torque to the torque-limiter coupling 122 as described further herein. The actuator 126 may be coupled to the torque-limiter coupling 122 via a fastener 128. The fastener 128, shown as a bolt in the illustrated embodiment, may pass through an actuator hole 130 in the actuator 126 and into a threaded recess 214 (FIG. 2) in the torque-limiter coupling 122.

In the operational life of the valve or driven system coupled to the actuator system 100, an event may occur in which the drive mechanism 105, particularly the worm gear 106, may be unable to rotate while subject to normal operating torque. This event may occur due to the attached valve being jammed, completely opened, or completely closed. Further, this event may occur due to an operational failure of the valve actuator system 100. In this event, application of torque to the drive mechanism 105 greater than a particular torque value may damage the worm shaft 110, the helical gear 112, or the worm gear 106. In a conventional system, an operator may apply excessive torque and thereby damage the drive mechanism 105, particularly if the operator is unaware of the root cause preventing rotation. Damage to the drive mechanism 105 may require costly repairs or replacement of the entire gearbox assembly 102, such that significant downtime and material costs may accrue.

However, with the torque-limiter coupling 122, the retainer 124 may be chosen such that a force required to fracture or release the retainer 124 is less than a critical force, which would damage components of the drive mechanism 105. As such, a gradually increasing torque applied by the actuator 126 would instead fracture or release the retainer 124 (e.g., breaking the cotter pin in the illustrated embodiment). The fracture or release of the retainer 124 may disengage the torque-limiter coupling 122 and actuator 126 from the worm shaft 110, as previously discussed. Thus, any further application of torque by the actuator 126 would no longer transmit any torque to the drive mechanism 105, preventing any damage to the more sensitive or costly components.

Figure 2:
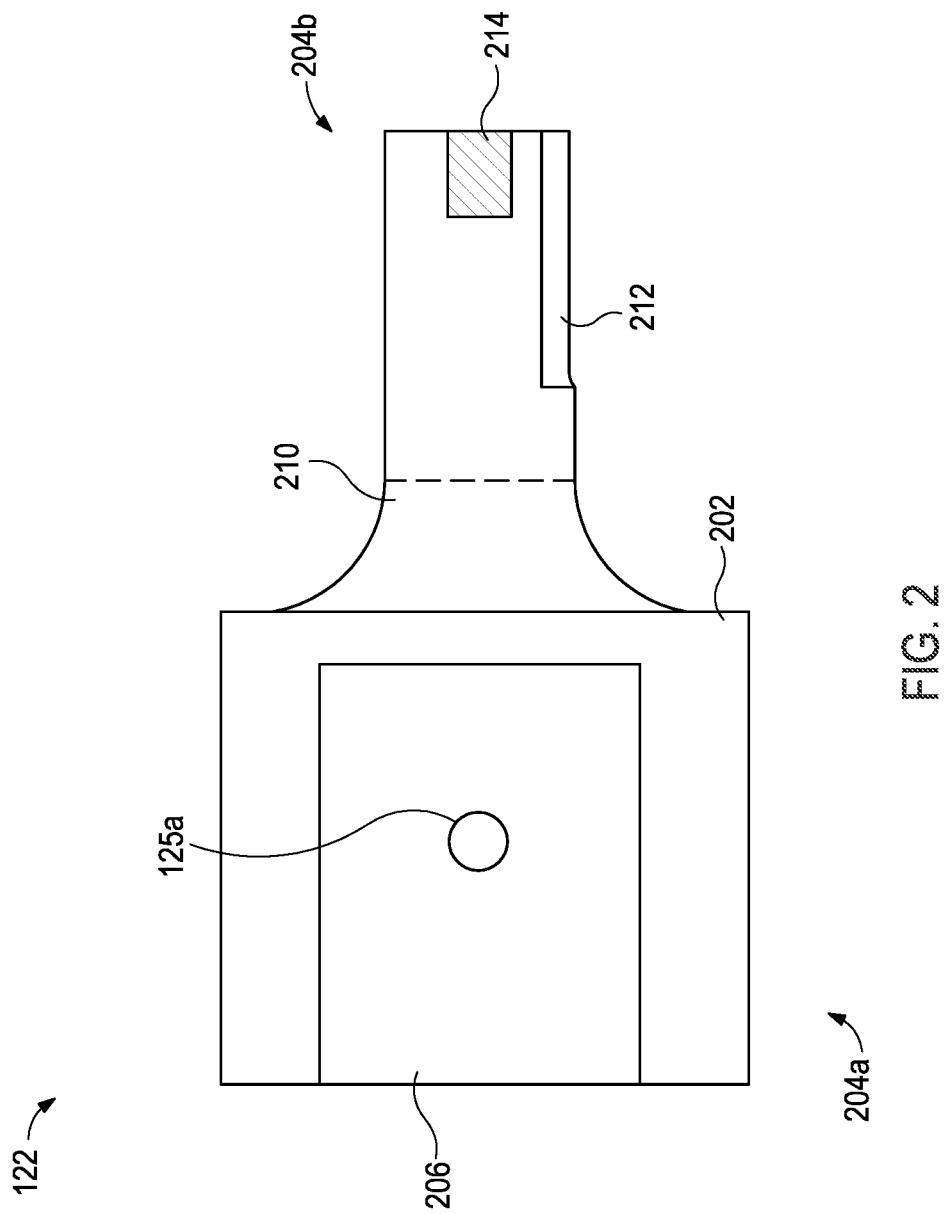
FIG. 2 is a cross-sectional side view of the torque-limiter coupling of FIG. 1A.

FIG. 2 is a cross-sectional side view of the torque-limiter coupling 122. The torque-limiter coupling 122 may define or otherwise include a body 202 which may be formed of stainless steel, cast iron, or other suitable material. The body 202 may further define or otherwise include a proximal end 204a which may be configured for attachment to a shaft of a gearbox assembly (e.g., the worm shaft 110 of FIGS. 1A-1B), and a distal end 204b which may be configured for attachment to an actuator, such as a handwheel, (e.g., the actuator 126 of FIG. 1A). The proximal end 204*a* may include a recessed interior 206 sized to accept a shaft of a gearbox within a specified tolerance or clearance. The proximal end 204*a* may further include the coupling hole 125*a* which may run through the entire thickness of the body 202 for insertion of a retainer (e.g., the retainer 124 of FIG. 1A-1B) for mating a shaft of the gearbox assembly to the torque-limiter coupling 122.

The body 202 may define a transitional section 210 between the proximal end 204*a* and the distal end 204*b*. The transitional section 210 may exhibit a tapered or rounded geometry, such that stress risers are limited within the body 202. The distal end 204*b* may define a key slot 212, which is configured to mate with a key (not shown) of the actuator 126 for secure transmission of torque into the torque-limiter coupling 122. The illustrated embodiment shows a single key slot 212, however those skilled in the art will readily appreciate that two or more key slots 212 may be defined on the body 202 without departing from the scope of this disclosure. The distal end 204*b* may further define a threaded recess 214 which may be configured to accept a threaded fastener 128 (FIG. 1A). The threaded recess 214 may enable secure attachment of the actuator 126 to the torque-limiter coupling 122, while the key slot 212 may prevent unfastening of the threaded fastener 128 within the threaded recess 214 due to the rotation of the actuator 126.

The torque-limiter coupling 122 may be mated to the actuator 126 at the distal end 204*b* and mated to the worm shaft 110 at the proximal end 204*a*, such that torque may be transferred through the torque-limiter coupling 122 to drive the drive mechanism 105 (FIG. 1A). During operation, if large enough torques are applied to the distal end 204*b*, and the worm shaft 110 is unable to rotate, the retainer within the hole 125*a* may fracture or release. Accordingly, the torque-limiter coupling 122 may then freely rotate about the worm shaft 110 inserted into the recessed interior 206 at the proximal end 204*a*. No torque is transferred to the worm shaft 110, thus preventing any damage to the drive mechanism 105 or other components of the gearbox assembly 102. With the relatively simple design, the torque-limiter coupling 122 may be manufactured in-house without a need for outsourcing of production or downtime waiting for replacement parts if damaged. Further, the low cost of replacing the retainer 124 (FIGS. 1A-1B) following an over-torque or jamming event may be significantly cheaper than replacing the gearbox assembly 102 or internal components thereof.

Figure 3:
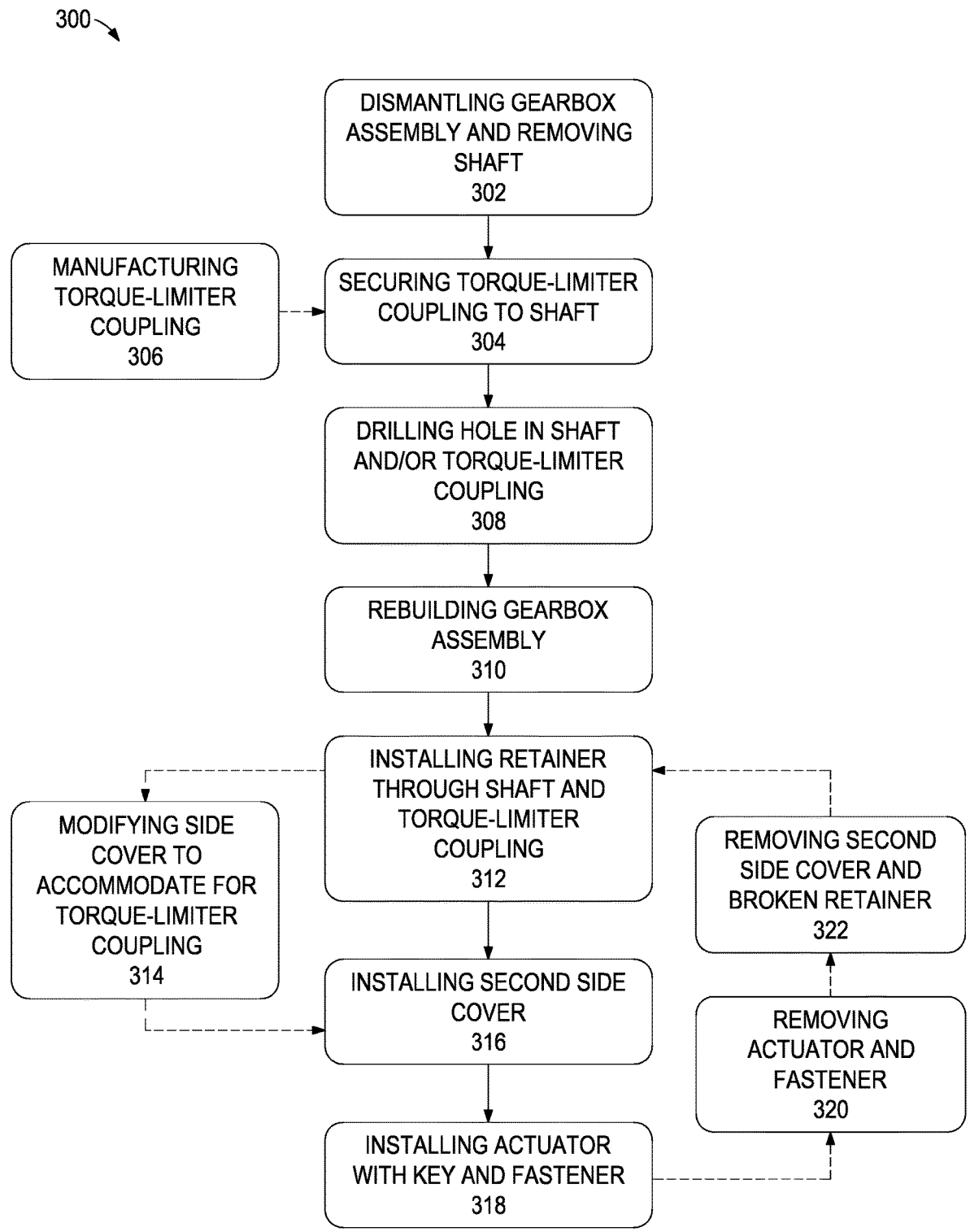
FIG. 3 is a flow chart illustrating a procedure for installation of a torque-limiter coupling, according to at least one embodiment of the present disclosure.

FIG. 3 is a schematic view of a flow chart for a method 300 of installation of a torque-limiter coupling, according to at least one embodiment of the present disclosure. The method 300 may begin at 302 with dismantling a gearbox assembly (e.g., the gearbox assembly 102 of FIG. 1A) and removal of a shaft (e.g., the worm shaft 110 of FIG. 1A) from within if necessary. In the illustrated embodiment, the gearbox assembly may be fitted with a conventional coupling for connecting the shaft to an actuator, such as a handwheel (e.g., the actuator 126 of FIG. 1A). Removal of the shaft may facilitate sizing, fitting and installing a new coupling thereon.

The method 300 may continue at 304 with loading a torque-limiter coupling (e.g., the torque-limiter coupling 122 of FIGS. 1A, 1B and 2) onto the shaft previously removed. In at least one embodiment according to the present disclosure, the torque-limiter coupling includes a pre-drilled hole (e.g., the coupling hole 125*a* of FIG. 1B) for insertion of a retainer (e.g., the retainer 124 of FIGS. 1A and 1B). As such, loading the torque-limiter coupling to the shaft may include alignment of the pre-drilled hole on the coupling with a pre-drilled hole on the shaft (e.g., the shaft hole 125*b* of FIG. 1B).

In at least one embodiment, the method 300 may include manufacturing of the torque-limiter coupling at 306, prior to securing the torque-limiter coupling to the shaft at 304. In these embodiments, the torque-limiter coupling may be manufactured in-house or at a job-site, such that faster and cheaper replacement may be performed. The torque-limiter coupling may be additively manufactured or traditionally manufactured on-site due to the simplistic geometry and lack of moving parts.

In embodiments without pre-drilled holes in the torque-limiter coupling and/or the shaft, the method 300 may continue at 308 with drilling a hole (e.g., the coupling hole 125*a* and shaft hole 125*b* of FIG. 1B) through the shaft and/or the torque-limiter coupling. In embodiments where the torque-limiter coupling includes a pre-drilled hole but the shaft does not, a hole may be drilled in the shaft through the pre-drilled hole of the torque-limiter coupling to maintain alignment. In alternate embodiments where neither the torque-limiter coupling nor the shaft includes a pre-drilled hole, a hole may be drilled through both the shaft and the torque-limiter coupling for insertion of a retainer.

The method 300 may continue at 310 with rebuilding the gearbox assembly that was previously dismantled. The shaft may be reinserted into the gearbox assembly, and may be re-mated with any additional components of the drive mechanism (e.g., the drive mechanism 105 of FIG. 1A), such as a worm gear (e.g., the worm gear 106 of FIG. 1A). The drive components may be secured into a re-assembled gearbox housing (e.g., the gearbox housing 104 of FIG. 1A), and accordingly maintained in place. Rebuilding the gearbox assembly at 310 may further include attachment of a first side cover (e.g., the first side cover 116 of FIG. 1A) and bearing (e.g., the bearing 114 of FIG. 1A) on a side of the gearbox assembly opposite a side on which the torque-limiter coupling is to be installed.

At 312, the method 300 may continue with installing a retainer through the holes defined through the shaft and the torque-limiter coupling. The retainer may operatively couple the shaft to the torque-limiter coupling for transmission of torque. In at least one embodiment, the retainer may be a cotter pin which forms an interference fit within the holes, such that rotation of the torque-limiter coupling is transferred to the shaft. In alternate embodiments, however, the retainer may include a shear pin, or a resettable linkage designed to disconnect at a given force or torque without fracturing or loss of the retainer.

In at least one embodiment of the present disclosure, the method may continue at 314 with modification of a second side cover (e.g., the second side cover 118 of FIG. 1A) to accommodate for the torque-limiter coupling. The added size and protrusion of the torque-limiter coupling may require enlargement of a hole in the second side cover, or extension of the thickness to cover the newly added component. In at least one embodiment, a new second side cover may be manufactured on-site at 314 in place of modification of an existing second side cover. Regardless of the need for modification or manufacture of a new second side cover, at 316 the method 300 may include installing a second side cover over the shaft, the torque-limiter coupling, and a bearing. The installation of the second side cover at 316 may enable rotation of the shaft between bearings while further securing the torque-limiter coupling to the shaft. The installation of the second side cover at 316 may enable a portion of the torque-limiter coupling, such as a distal portion (e.g., the distal end 204b of FIG. 2) to protrude from the gearbox assembly and second side cover.

At 318, the method 300 may include installing an actuator (e.g., the actuator 126 of FIG. 1A), such as a handwheel, onto the torque-limiter coupling via a key and key slot (e.g., the key slot 212 of FIG. 2) and one or more fasteners (e.g., the fastener 128 of FIG. 1). The installation of the actuator at 318 may fully complete the assembly of the valve actuator system (e.g., the valve actuator system 100 of FIG. 1A). As such, the actuator may provide torque to the torque-limiter coupling, which in turn rotates a shaft of the drive mechanism for transmission of torque to attached valve or driven system. During application of torque by the actuator, the drive mechanism, or connected valve or driven system, may become jammed or otherwise inoperable. In this event, further torque applied by the actuator does not over-torque or overload the drive mechanism and gearbox assembly. However, the retainer installed into the torque-limiter coupling may be designed or chosen to have a lower critical force, stress, or torque for fracture or release than would damage the drive mechanism and gearbox assembly. In this case, the retainer may release or fracture before damage can be incurred by the drive mechanism, gearbox assembly, or connected valve or driven system. The fracture or release of the retainer may cause any additional torque applied by the actuator to rotate the torque-limiter coupling independent of the drive mechanism, preventing any damage. In these embodiments, repairs may be performed as needed for the valve or connected system to address the root cause of the jamming or inoperable status.

The method 300 may then continue at 320 with removing the actuator and the fastener connecting the actuator to the torque-limiter coupling. Following removal of the actuator and the fastener at 320, the method 300 may continue at 322 with removing the second side cover and the broken or released retainer. The removal of the second side cover may enable access to the torque-limiter coupling and retainer for repairs. In embodiments in which the retainer is a cotter pin or shear pin, the fractured cotter pin or shear pin and any debris resulting from the fracture may be removed. In alternate embodiments with resettable retainers, the retainer may be removed and reset for subsequent redeployment. Regardless of the form of the retainer, the replacement or reset of the retainer may be the only repair required due to over-torque or overload, compared to possible gearbox assembly replacement without the torque-limiter coupling. Following removal of the retainer and second side cover, the method 300 may return to 312 with installation of a subsequent retainer and onto 316 and 318 with reinstallation of the second side cover and actuator to place the valve actuator system back into operational status. The method 300 may thus continue with replacement of the retainer as needed without requiring further repairs, thus eliminating any over-torqueing risk to the drive and connected valve or system.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A valve actuator system comprising:
 a gearbox assembly including an output gear for coupling to a valve stem, an input gear operably coupled to the output gear to drive rotation of the output gear and an input shaft operably coupled to the input gear to drive rotation of the input gear;
 a torque-limiter coupling defining a proximal end and a distal end, the proximal end including a recessed interior accepting the input shaft of the gearbox assembly therein;
 a retainer operatively coupling the torque-limiter coupling and the input shaft to transmit torque therebetween, the retainer operable to disengage the torque-limiter coupling from the input shaft in response to a torque applied to the torque limiter-coupling exceeding a predetermined shear limit to prevent damage to the gearbox assembly; and
 an operatively detachably coupled to the distal end of the torque-limiter coupling with one or more fasteners to provide torque to the torque-limiter coupling.

2. The valve actuator system of claim 1, wherein the actuator comprises a handwheel for manual provision of torque by an operator.

3. The valve actuator system of claim 1, wherein the retainer is operable to fracture at the critical torque to thereby disengage the torque-limiter coupling from the input shaft and prevents further torque transmission from the actuator to the gearbox assembly.

4. The valve actuator system of claim 3, wherein the retainer comprises a cotter pin inserted into aligned holes defined through both the input shaft and the torque-limiter coupling.

5. The valve actuator system of claim 1, wherein the gearbox assembly includes a worm drive, wherein the output gear is a worm gear, and the input gear is a worm shaft with a helical gear defined on the input shaft.

6. The valve actuator system of claim 1, wherein the torque-limiter coupling further comprises a transitional section with tapered or rounded geometry defined between the proximal end and the distal end.

7. The valve actuator system of claim 1, wherein the gearbox assembly includes a gearbox housing and first and second bearings supporting the input shaft in the gearbox housing.

8. A method, comprising:
locating a gearbox assembly including an output gear coupled to a valve stem of a valve, wherein the gearbox assembly includes an input gear operably coupled to the output gear to drive rotation of the output gear and an input shaft operably coupled to the input gear to drive rotation of the input gear;
securing a torque-limiter coupling to the input shaft of the gearbox assembly such that the torque-limiter coupling freely rotates about the input shaft;
installing a retainer to extend between the torque-limiter coupling and the input shaft to transmit torque therebetween, the retainer operable to disengage the torque-limiter coupling from the input shaft in response to a torque applied to the torque limiter-coupling exceeding a critical torque predetermined to prevent damage to the gearbox assembly; and
detachably coupling an actuator onto the torque-limiter coupling with one or more fasteners such that the actuator is operatively coupled to the input shaft to transmit torque thereto.

9. The method of claim 8, further comprising:
dismantling the gearbox assembly to remove the input shaft from a gearbox housing of the gearbox assembly;
drilling a hole through the torque-limiter coupling and into the input shaft; and
rebuilding the gearbox assembly to re-couple the input shaft to the gearbox housing.

10. The method of claim 9, wherein rebuilding the gearbox assembly further comprises:
mating a helical gear defined on the input shaft with a worm gear of the gearbox assembly to form a drive mechanism; and
securing the drive mechanism within the gearbox housing.

11. The method of claim 8, wherein the torque-limiter coupling defines a recessed interior, and wherein securing the torque-limiter coupling to the input shaft comprises receiving the input shaft within the recessed interior and thereby coupling the actuator to the torque-limiter coupling.

12. The method of claim 8, further comprising:
selecting the retainer to have a fracture strength such that the retainer fractures at the critical torque to thereby disengage the torque-limiter coupling from the input shaft.

13. The method of claim 12, further comprising:
applying a torque greater than the critical torque to the torque-limiter coupling with the actuator; and
fracturing the retainer to disengage the torque-limiter coupling from the input shaft of the gearbox assembly.

14. The method of claim 13, further comprising:
removing the actuator from the torque-limiter coupling; and
removing the fractured retainer from the torque-limiter coupling and the input shaft.

15. The method of claim 14, further comprising:
installing a subsequent retainer onto the torque-limiter coupling and the input shaft;
re-installing a side cover of the gearbox assembly; and
re-installing the actuator on to the torque-limiter coupling.

16. The valve actuator system of claim 6, wherein the proximal end of the torque-limiter coupling includes a cross-sectional diameter greater than a cross-sectional diameter of the distal end.

17. The valve actuator system of claim 6, wherein the transitional section is defined circumferentially around the torque-limiter coupling.

18. The method of claim 14, wherein removing the actuator from the torque-limiter coupling includes removing a threaded fastener from a threaded recess in the torque-limiter coupling.

19. The method of claim 15, wherein re-installing the actuator on to the torque-limiter coupling includes:
aligning a threaded recess of the torque-limiter coupling with an actuator hole of the actuator; and
inserting a threaded fastener through the actuator hole and into the threaded recess to detachably couple the actuator to the torque-limiter coupling.

20. A torque-limiter coupling comprising:
a cylindrical body, the body including:
a proximal end including a recessed interior for accepting an input shaft of a gearbox assembly therein and a coupling hole defined laterally through the proximal end and recessed interior;
a distal end defining a threaded recess for detachably coupling with an actuator and a key slot for receiving a key of the actuator; and
a transitional section with tapered or rounded geometry extending between a larger cross-sectional area diameter of the proximal end and a smaller cross-sectional diameter of the distal end; and
a retainer receivable within the coupling hole to operatively couple the torque-limiter coupling to the input shaft of the gearbox assembly, the retainer operable to disengage the torque-limiter coupling from the input shaft in response to a torque applied to the torque limiter-coupling exceeding a predetermined shear limit.

* * * * *